United States Patent
Taguchi

(10) Patent No.: US 8,428,812 B2
(45) Date of Patent: Apr. 23, 2013

(54) TRAVEL TRACE GENERATION METHOD AND TRAVEL TRACE GENERATION DEVICE

(75) Inventor: Koji Taguchi, Isehara (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 208 days.

(21) Appl. No.: 12/525,197

(22) PCT Filed: Oct. 30, 2008

(86) PCT No.: PCT/JP2008/069779
§ 371 (c)(1),
(2), (4) Date: Jul. 30, 2009

(87) PCT Pub. No.: WO2009/057703
PCT Pub. Date: May 7, 2009

(65) Prior Publication Data
US 2010/0138099 A1 Jun. 3, 2010

(30) Foreign Application Priority Data
Nov. 1, 2007 (JP) .................................. 2007-285461

(51) Int. Cl.
*G06F 19/00* (2011.01)
(52) U.S. Cl.
USPC ............... 701/31.4; 701/22; 701/29.1; 701/7; 701/445; 701/446
(58) Field of Classification Search .................. None
See application file for complete search history.

(56) References Cited

U.S. PATENT DOCUMENTS

| 5,504,682 | A | * | 4/1996 | Shiraishi et al. .............. 701/111 |
| 5,552,990 | A | * | 9/1996 | Ihara et al. .................... 701/446 |
| 5,841,366 | A | * | 11/1998 | Yamamoto et al. ............ 340/901 |
| 6,122,577 | A | * | 9/2000 | Mergenthaler et al. ....... 701/30.2 |
| 6,609,051 | B2 | * | 8/2003 | Fiechter et al. .............. 701/29.3 |
| 7,275,795 | B2 | * | 10/2007 | Nishina et al. ................ 303/186 |
| 7,344,288 | B2 | * | 3/2008 | Kobayashi et al. ........... 362/466 |
| 7,426,975 | B2 | * | 9/2008 | Toyota et al. ................. 180/165 |
| 7,519,464 | B2 | * | 4/2009 | Sakugawa ....................... 701/70 |

(Continued)

FOREIGN PATENT DOCUMENTS

| JP | A-07-192194 | 7/1995 |
| JP | A-11-208306 | 8/1999 |

(Continued)

OTHER PUBLICATIONS

Fujioka et al., "Numerical Analysis of Minimum-Time Cornering," *Transactions of Society of Automotive Engineers of Japan*, vol. 24, No. 3, pp. 106-111, 1993, with Abstract.

*Primary Examiner* — Khoi Tran
*Assistant Examiner* — Jonathan L Sample
(74) *Attorney, Agent, or Firm* — Oliff & Berridge, PLC

(57) ABSTRACT

A running locus generating apparatus 1 for generating a future running locus of a vehicle driven by a hybrid scheme comprises constraint condition computing means 30 for convergently computing a constraint condition including at least a road boundary condition and evaluation function computing means 30 for deriving a running locus by a convergent computation with an evaluation function including at least an evaluation of an electric power balance in a hybrid system when the electric power balance is positive in a state where the constraint condition by the constraint condition computing means 30 is satisfied.

8 Claims, 7 Drawing Sheets

U.S. PATENT DOCUMENTS

| | | | |
|---|---|---|---|
| 7,632,212 B2 * | 12/2009 | Yamanaka et al. | 477/107 |
| 8,010,264 B2 * | 8/2011 | Ogata et al. | 701/55 |
| 8,010,280 B2 * | 8/2011 | Sekine | 701/445 |
| 8,170,725 B2 * | 5/2012 | Chin et al. | 701/1 |
| 2002/0049523 A1 * | 4/2002 | Diaz et al. | 701/33 |
| 2002/0188387 A1 * | 12/2002 | Woestman et al. | 701/22 |
| 2003/0006076 A1 * | 1/2003 | Tamor | 180/65.2 |
| 2005/0055157 A1 * | 3/2005 | Scholl | 701/207 |
| 2006/0196712 A1 * | 9/2006 | Toyota et al. | 180/165 |
| 2007/0038340 A1 * | 2/2007 | Sekiguchi et al. | 701/22 |
| 2008/0224478 A1 * | 9/2008 | Tamor | 290/40 C |
| 2008/0288132 A1 * | 11/2008 | King et al. | 701/22 |
| 2010/0082238 A1 * | 4/2010 | Nakamura et al. | 701/208 |
| 2010/0138099 A1 * | 6/2010 | Taguchi | 701/29 |

FOREIGN PATENT DOCUMENTS

| | | |
|---|---|---|
| JP | A-2000-346594 | 12/2000 |
| JP | A-2003-070102 | 3/2003 |
| JP | A-2003-099897 | 4/2003 |
| JP | A-2004-251786 | 9/2004 |
| JP | A-2004-326363 | 11/2004 |
| JP | A-2005-182186 | 7/2005 |
| JP | A-2005-228139 | 8/2005 |
| JP | A-2008-195226 | 8/2008 |

* cited by examiner

TRAVEL TRACE GENERATION METHOD AND TRAVEL TRACE GENERATION DEVICE

TECHNICAL FIELD

The present invention relates to a running locus generating method and a running locus generating apparatus which generate a future running locus of a vehicle.

BACKGROUND ART

Techniques for generating an optimal running locus of a vehicle and performing various driving assistances and automatic driving by utilizing the running locus have been developed. The apparatus described in Patent Literature 1 detects a road shape in front of an own vehicle, computes an own vehicle future position according to the road shape and the running speed of the own vehicle, and displays the own vehicle future position by projecting it onto a windshield. In the case of a curved road in particular, a clipping point which is a characteristic point of the curved road and the own vehicle future position are displayed together as being projected onto the windshield. On the other hand, Non Patent Literature 1 discloses a method of generating an optimal running locus for running through a curved road at the fastest speed.

Patent Literature 1: Japanese Patent Application Laid-Open No. 2005-228139

Non Patent Literature 1: FUJIOKA Takehiko and EMORI Daisuke, "Numerical Analysis of Minimum-Time Cornering", Transactions of Society of Automotive Engineers of Japan, Vol. 24, No. 3, July 1993, p 106-111.

DISCLOSURE OF INVENTION

Technical Problem

Future running locus generating methods are methods of generating a future locus in which the fastest running or the like is used as an evaluation condition without taking account of a mileage characteristic. Therefore, accelerator and brake operations are likely to be maximized, thus yielding running loci which are inferior in terms of mileage. In the case of a curved road in particular, acceleration or deceleration is necessary while a lateral force is generated, whereby running loci with a poor mileage are obtained unless a mileage characteristic is taken into account.

It is therefore an object of the present invention to provide a running locus generating method and running locus generating apparatus for generating a running locus taking account of a mileage characteristic.

Solution to Problem

The running locus generating method in accordance with the present invention is a running locus generating method for generating a future running locus of a vehicle driven by a hybrid scheme, the method comprising a constraint condition computing step of convergently computing a constraint condition including at least a road boundary condition and an evaluation function computing step of deriving a running locus by a convergent computation with an evaluation function including at least an evaluation of an electric power balance in a hybrid system when the electric power balance is positive in a state where the constraint condition in the constraint condition computing step is satisfied.

This running locus generating method initially carries out a convergent computation according to a constraint condition including at least a road boundary condition and then a convergent computation with an evaluation function including at least an evaluation condition of an electric power balance (electric power stored by motor regeneration—electric power used by motor output) in a hybrid system when the electric power balance is positive (the stored electric power is more than the used electric power) while keeping the constraint condition, so as to derive a running locus which makes the evaluation optimal. In a hybrid vehicle, kinetic energy can be transformed into electric energy by regeneration, and this electric energy can be outputted again as kinetic energy. Therefore, for improving the mileage, it is important for a battery to be charged by regeneration anytime when a brake operation is done during running in order to recover energy without loss. When a brake operation occurs during running in the case where the battery is fully charged, charging by regeneration cannot be carried out, whereby a hydraulic brake is actuated. Therefore, the kinetic energy at the time of deceleration cannot be recovered as electric energy, so that the energy becomes useless, whereby the running path as a whole fails to yield an ideal state of mileage. Hence, an evaluation function for optimization is made to include an electric power balance by motor regeneration and reoutput in the case where the electric power balance is positive. Optimizing the running locus by using this evaluation function allows the running path as a whole to attain an electric power balance of 0 or less (reduce the amount of charge of the battery), so that the battery is always chargeable by regeneration, whereby the kinetic energy at the time of deceleration can be prevented from becoming useless. Thus, by making an evaluation function include an electric power balance in the case where the electric power balance is positive, this running locus generating method can generate a running locus taking account of a mileage characteristic, thereby contributing to improving the mileage. In particular, it can generate an optimal running locus taking account of a mileage characteristic for a curved road which generates a lateral force and requires acceleration or deceleration.

The above-mentioned running locus generating method of the present invention may further comprise an initial condition generating step of generating a running locus preferring regenerative deceleration when decelerating the vehicle as an initial condition.

In the case of a hybrid vehicle, this running locus generating method generates a running locus preferring regenerative deceleration at the time of deceleration and carries out a constraint condition convergent computation and an evaluation function convergent computation while using this running locus as an initial condition. Carrying out deceleration preferring regenerative deceleration (i.e., focusing on deceleration by regenerative braking or deceleration by regenerative braking alone) can reduce the energy loss caused by heat dissipation at the time when the hydraulic brake is actuated, thereby contributing to improving the mileage. When optimization is effected while employing a running locus thus taking account of a mileage characteristic as an initial condition, a running locus closer to the optimal locus can be used from the beginning of optimization processing, erroneous running loci can be prevented from being caused by local minima, so that the optimal locus can be approached soon, whereby the processing load can be reduced. Thus, by generating an initial condition focused on regenerative deceleration in a hybrid scheme beforehand, this running locus generating method can derive a running locus excellent in the mileage characteristic reliably with a low processing load. When an optimizing technique is used for a vehicle, there is a possibility of erroneous solutions being derived by local minimum solutions in the optimizing technique because of hysteresis due to a transmission and the like (e.g., hysteresis from the second gear to third gear and from the third gear to second gear).

The initial condition generating step in the above-mentioned running locus generating method of the present invention may generate a running locus moving a clipping point and a minimum speed point toward a curve entrance and a curve exit, respectively, according to deceleration and acceleration upper limits determined by a system capability of the hybrid scheme.

Deceleration by regeneration alone yields a leeway at the time of braking (a leeway in the longitudinal force) by the amount of deceleration by the hydraulic brake as compared with deceleration by the deceleration capability (deceleration by the regenerative brake+deceleration by the hydraulic brake) of the vehicle as a whole. Therefore, when assuming a friction circle limit by lateral and longitudinal forces, distributing the leeway to the lateral force at the time of deceleration in a curved road can elongate a running curve by the leeway at the time of deceleration, while it approaches a line at the time of acceleration because there is no leeway. For attaining such a running locus on a curved road, it is necessary to move a clipping point and a minimum speed point toward the curve entrance and exit, respectively. Therefore, the initial condition generating step determines a deceleration upper limit and an acceleration upper limit in view of a system capability of the hybrid scheme, and moves the clipping point and minimum speed point toward the curve entrance and exit, respectively, according to the deceleration upper limit and acceleration upper limit, thereby generating a running locus.

The above-mentioned running locus generating method of the present invention may further comprise a block dividing step of dividing a continuous curve into a plurality of blocks, a fastest running optimizing step of performing optimization processing under a fastest running condition, a passing time computing step of computing respective passing times of the blocks divided by the block dividing step according to a result of the optimization in the fastest running optimizing step, a leeway time computing step of computing respective leeway times of the blocks divided by the block dividing step according to respective brake heat dissipating amounts in the blocks, and a target passing time computing step of computing respective target passing times of the blocks according to the respective passing times of the blocks computed in the passing time computing step and the respective leeway times of the blocks computed in the leeway time computing step.

In the case of a continuous curve, this running locus generating method divides the continuous curve into a plurality of blocks. Also, the running locus generating method subjects the whole continuous curve to optimization processing under a fastest running condition, and computes respective passing times of the blocks at the time of fastest running from the result of optimization under the fastest running condition. Further, the running locus generating method computes respective leeway times proportional to respective brake heat dissipating amounts in the blocks. Then, the running locus generating method computes respective target passing times of the blocks according to the respective passing times and leeway times of the blocks in the fastest running. Thus dividing a continuous curve (e.g., a winding road) into blocks and distributing leeway times (which may be later than the fastest running) to the blocks in proportion to the brake heat dissipating amounts (which are useless energies and deteriorate the mileage) of the blocks can achieve optimization in each block by dividing the blocks into those focused on the mileage and those focused on passing times. In such a manner, this running locus generating method can carry out optimization processing for each block while using the target passing time of the block as a constraint condition, whereby the memory and processing load can be reduced. When a plurality of blocks as a whole are subjected to optimization processing, an enormous memory and a complicated program are necessary, whereby the processing load increases.

The running locus generating apparatus in accordance with the present invention is a running locus generating apparatus for generating a future running locus of a vehicle driven by a hybrid scheme, the apparatus comprising constraint condition computing means for convergently computing a constraint condition including at least a road boundary condition and evaluation function computing means for deriving a running locus by a convergent computation with an evaluation function including at least an evaluation of an electric power balance in a hybrid system when the electric power balance is positive in a state where the constraint condition by the constraint condition computing means is satisfied.

The above-mentioned running locus generating apparatus of the present invention may further comprise initial condition generating means for generating a running locus preferring regenerative deceleration when decelerating the vehicle as an initial condition.

The initial condition generating means in the above-mentioned running locus generating apparatus of the present invention may generate a running locus moving a clipping point and a minimum speed point toward a curve entrance and a curve exit, respectively, according to deceleration and acceleration upper limits determined by a system capability of the hybrid scheme.

The above-mentioned running locus generating apparatus of the present invention may further comprise block dividing means for dividing a continuous curve into a plurality of blocks, fastest running optimizing means for performing optimization processing under a fastest running condition, passing time computing means for computing respective passing times of the blocks divided by the block dividing means according to a result of the optimization by the fastest running optimizing means, leeway time computing means for computing respective leeway times of the blocks divided by the block dividing means according to respective brake heat dissipating amounts in the blocks, and target passing time computing means for computing respective target passing times of the blocks according to the respective passing times of the blocks computed by the passing time computing means and the respective leeway times of the blocks computed by the leeway time computing means.

These running locus generating apparatus yield operations and effects similar to those of the running locus generating methods mentioned above.

ADVANTAGEOUS EFFECTS OF INVENTION

By carrying out optimization with an evaluation function including an electric power balance in a hybrid system when the electric power balance is positive, the present invention can generate a running locus taking account of a mileage characteristic, thereby contributing to improving the mileage.

Figure 1:
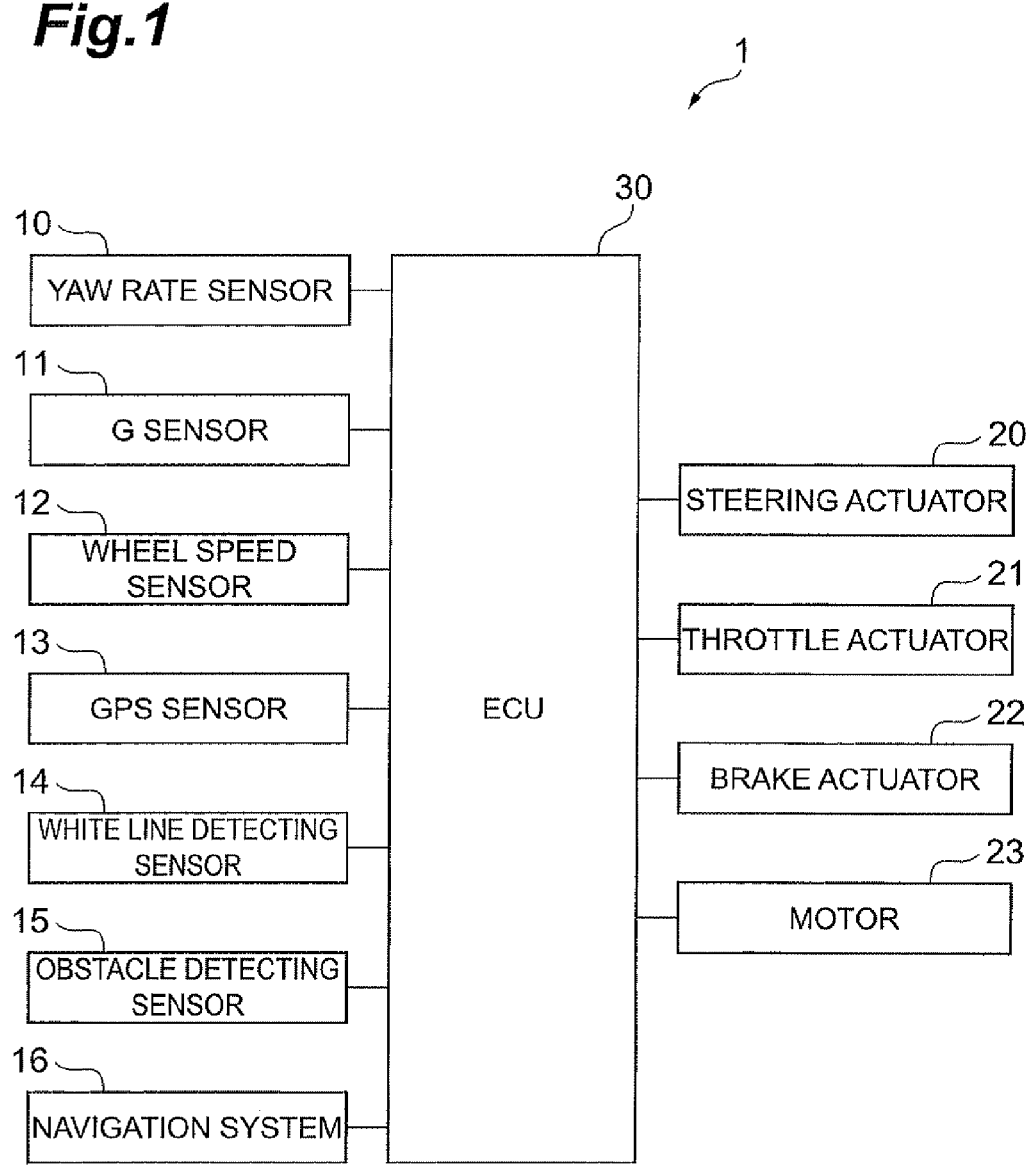
[FIG. 1] is a structural diagram of an automatic driving control apparatus in accordance with an embodiment.

REFERENCE SIGNS LIST 1 automatic driving control apparatus
10 yaw rate sensor
11 G sensor
12 wheel speed sensor
13 GPS sensor
14 white line detecting sensor
15 obstacle detecting sensor
16 navigation system
20 steering actuator
21 throttle actuator
22 brake actuator
23 motor
30 ECU Description of Embodiments In the following, an embodiment of the running locus generating method and running locus generating apparatus in accordance with the present invention will be explained with reference to the drawings.

This embodiment applies the present invention to an automatic driving control apparatus mounted to a hybrid vehicle which carries out automatic driving. The automatic driving control apparatus in accordance with this embodiment generates a running locus by optimization processing, and carries out acceleration/deceleration control and steering control so as to run along the optimal running locus.

Figure 2:
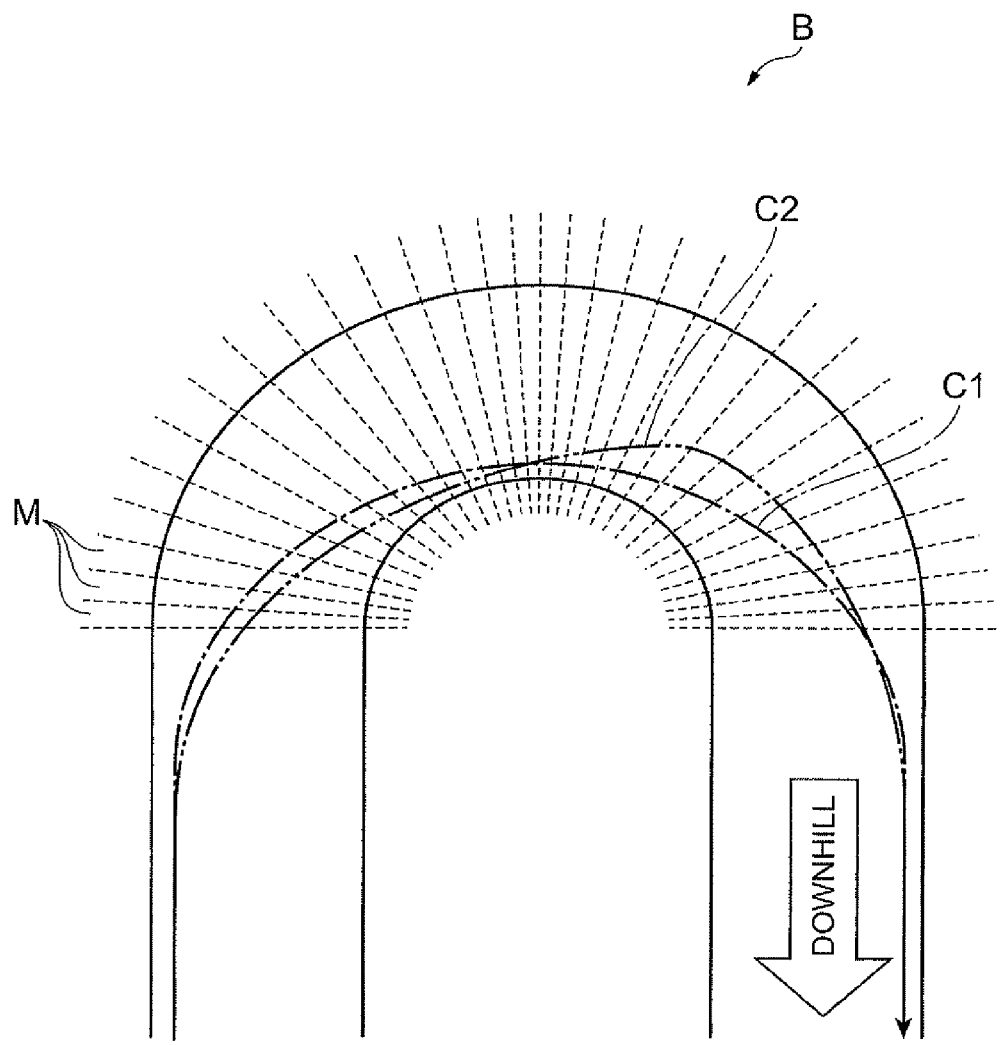
[FIG. 2] is an explanatory view of a running locus optimizing function in the automatic driving control apparatus in accordance with the embodiment.

The running locus to be generated is constituted by a number of parameters necessary for a vehicle to run, such as position (x-coordinate, y-coordinate), vehicle speed pattern ($v_x$, $v_y$), acceleration pattern ($a_x$, $a_y$), yaw angle, and yaw rate. As illustrated in FIG. 2, the automatic driving control apparatus in accordance with the embodiment treats one curved road or the like in units of blocks B, while a running locus in each block B is generated in meshes M, . . . which finely divide the running path along the running direction. Therefore, the running locus of one block B is constituted by (the number of meshes M, . . . ×the number of parameters) data items. When the number of parameters is 10 while the number of meshes is 100, for example, the running locus of one block B is constituted by 1000 data items.

In general, excessively slow running has been known to be ideal mileage running when a running condition focused on the mileage alone is set, while a running locus having a practically unusable vehicle speed pattern is generated when optimization processing is carried out under a running condition focused on the mileage alone. Hence, for suppressing it, the automatic driving control apparatus in accordance with this embodiment adds not only a mileage improvement condition but also a running time condition to an evaluation function for optimization processing.

Conventional optimization techniques have been able to generate an optimal running locus under circumstances where leftward and rightward tire frictions have ample margins, such as linear roads and expressways. However, curved roads make it necessary to fully decelerate a vehicle speed at which the vehicle can run on linear roads in front and rear of a curve, while deceleration, cornering, and acceleration are carried out during running through the curve, so that longitudinal acceleration/deceleration or a leftward/rightward lateral force occurs. Therefore, the automatic driving control apparatus in accordance with this embodiment generates a running locus which becomes optimal in curved roads in particular. Though this embodiment illustrates a technique for generating a running locus suitable for curved roads, it is also suitable for linear roads. The conventional generating techniques may be used for the linear roads.

When carrying out optimization processing, there is a possibility of erroneous solutions being derived by local minimum solutions in the optimizing technique because of hysteresis due to a transmission and the like (e.g., hysteresis from the second gear to third gear and from the third gear to second gear). Therefore, as preprocessing for the optimization processing, the automatic driving control apparatus in accordance with this embodiment generates a running locus closer to an optimal running locus as an initial condition.

Figure 3:
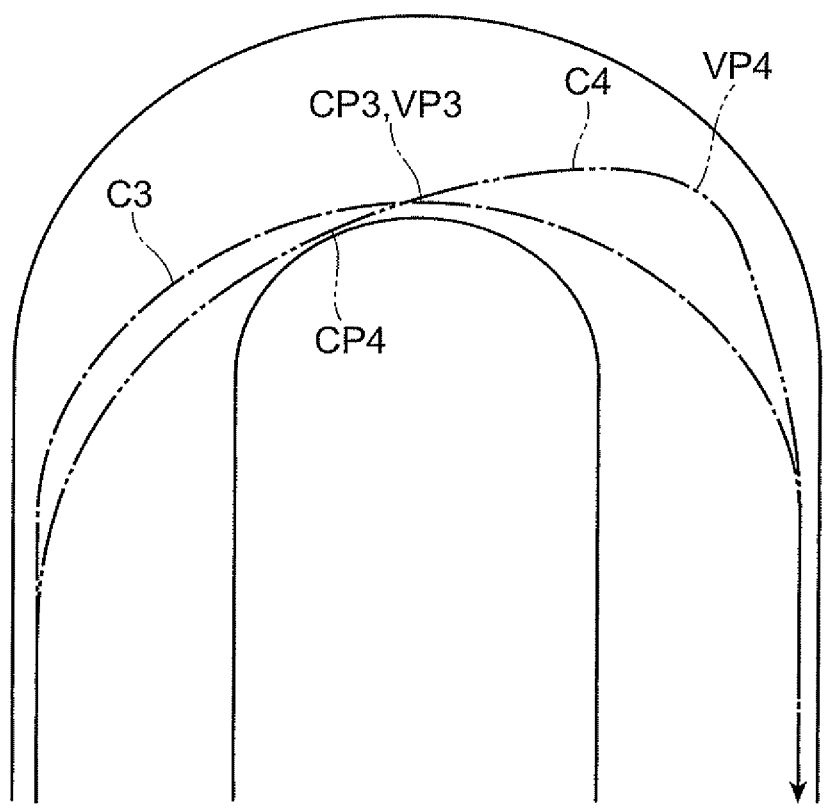
[FIG. 3] is an explanatory view of an initial condition generating function in the automatic driving control apparatus in accordance with the embodiment.
Figure 4:
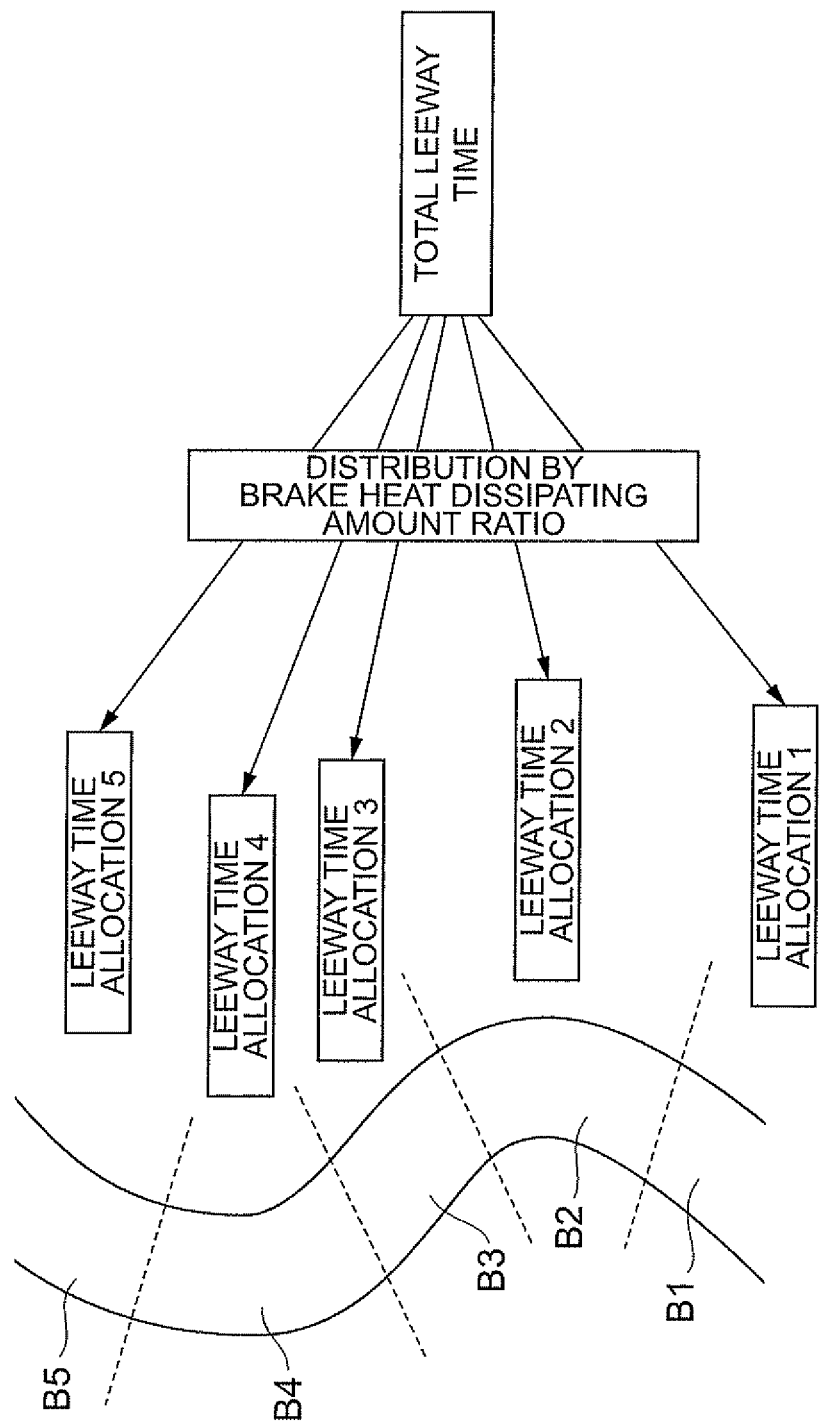
[FIG. 4] is an explanatory view of a continuous curve responding function in the automatic driving control apparatus in accordance with the embodiment.

With reference to FIGS. 1 to 4, the automatic driving control apparatus 1 in accordance with this embodiment will be explained. FIG. 1 is a structural diagram of the automatic driving control apparatus in accordance with this embodiment. FIG. 2 is an explanatory view of a running locus optimizing function in the automatic driving control apparatus in accordance with this embodiment. FIG. 3 is an explanatory view of an initial condition generating function in the automatic driving control apparatus in accordance with this embodiment. FIG. 4 is an explanatory view of a continuous curve responding function in the automatic driving control apparatus in accordance with this embodiment.

The automatic driving control apparatus 1 generates an optimal locus (a curved road in particular) satisfying a practical running time and an improvement in mileage at the same time. For generating the optimal locus, the automatic driving control apparatus 1 has a running locus optimizing function, an initial condition generating function, and a continuous curve responding function, as well as a vehicle control function for controlling a vehicle in automatic driving.

The automatic driving control apparatus 1 comprises a yaw rate sensor 10, a G sensor 11, a wheel speed sensor 12, a GPS (Global Positioning System) sensor 13, a white line detecting sensor 14, an obstacle detecting sensor 15, a steering actuator 20, a throttle actuator 21, a brake actuator 22, a motor 23, and an ECU (Electronic Control Unit) 30 and utilizes information from a navigation system 16.

The yaw rate sensor 10 is a sensor for detecting a yaw rate occurring in the own vehicle. The yaw rate sensor 10 detects the yaw rate and transmits it as a yaw rate signal to the ECU 30.

The G sensor 11 is a sensor for detecting lateral and longitudinal accelerations acting on the own vehicle. The G sensor 11 detects each acceleration acting on the own vehicle and transmits it as a G signal to the ECU 30. A lateral G sensor and a longitudinal G sensor are constructed for respective accelerations to be detected.

The wheel speed sensor 12 is a sensor, provided with each of four wheels of the vehicle, for detecting the rotating speed of the wheel (the number of pulses corresponding to the rotation of the wheel). The wheel speed sensor 12 detects the number of rotation pulses for each predetermined time and transmits thus detected number of wheel rotation pulses as a wheel speed signal to the ECU 30. The ECU 30 computes respective wheel speeds from the rotating speeds of the wheels, and a vehicle body speed (vehicle speed) from the respective wheel speeds of the wheels.

The GPS sensor 13, which comprises a GPS antenna, a processor, and the like, is a sensor for estimating a position of the own vehicle and the like. By using the GPS antenna, the GPS sensor 13 receives GPS signals from GPS satellites. The GPS sensor 13 demodulates the GPS signals with the processor and computes the position of the own vehicle and the like according to thus demodulated respective positional data items of the UPS satellites. Then, the GPS sensor 13 transmits a GPS information signal indicating the position of the own vehicle and the like to the ECU 30. Since positional data of three or more GPS satellites are necessary for computing the current position, the GPS sensor 13 receives respective GPS signals from three or more different GPS satellites.

The white line detecting sensor 14, which comprises a camera and an image processor, is a sensor for detecting a pair of white lines (lanes). By using the camera, the white line detecting sensor 14 captures a road in front of the own vehicle. Then, by using the image processor, the white line sensor 14 recognizes a pair of white lines indicating a lane where the vehicle is running. The lane width, the line passing the center of the pair of white lines (i.e., the center line of the lane), and the radius at the center of the lane (curve radius R) are computed from the recognized pair of white lines, while the curve curvature $\gamma(=1/R)$, the orientation of the vehicle (yaw angle) with respect to the white lines, the position of the vehicle center (offset) with respect to the center of the lane, and the like are computed from the curve radius R. The white line detecting sensor 14 transmits information about the recognized white lines and computed items as a white line detection signal to the ECU 30.

The obstacle detecting sensor 15, which comprises a millimeter-wave radar and a processor, is a sensor for detecting an obstacle (a vehicle or the like) existing about the own vehicle. The obstacle detecting sensor 15 causes the millimeter-wave radar to emit a millimeter wave and receives the millimeter wave returning after being reflected by an object. The processor in the obstacle detecting sensor 15 detects whether or not there is an obstacle according to millimeter-wave transmission and reception data, and computes the distance to the obstacle and the like when the obstacle is detected. The obstacle detecting sensor 15 transmits information about thus detected obstacle and computed items as an obstacle detection signal to the ECU 30. As the method of detecting the obstacle, any method may be used, examples of which include a method utilizing images captured by a camera, a method utilizing images captured by a camera and radar information such as millimeter waves, and a method of acquiring it through infrastructure communications.

The navigation system 16 is a system for detecting the current position of the own vehicle, guiding a route to a destination, and so forth. In particular, the navigation system 16 reads shape information of a road where the vehicle is currently running from a map database and transmits the road shape information as a navigation signal to the ECU 30. A vehicle lacking the navigation system may be equipped with a map database storing at least road shape information or acquire road shape information by utilizing road-vehicle communications and the like.

The steering actuator 20 is an actuator for transmitting a rotational driving force from a motor to a steering mechanism (rack, pinion, column, or the like) through a deceleration mechanism, so as to provide the steering mechanism with a steering torque. When the steering actuator 20 receives a steering control signal from the ECU 30, the motor is driven to rotate in response to the steering control signal, thereby generating a steering torque.

The throttle actuator 21 is an actuator for adjusting the opening of a throttle valve of an engine which is one of driving sources. Upon receiving an engine control signal from the ECU 30, the throttle actuator 21 operates in response to the engine control signal, so as to adjust the opening of the throttle valve.

The brake actuator 22 is an actuator for adjusting the brake hydraulic pressure of a wheel cylinder of each wheel. Upon receiving a brake control signal from the ECU 30, the brake actuator 22 operates in response to the brake control signal from the ECU 30, so as to adjust the brake hydraulic pressure of the wheel cylinder.

The motor 23 is an electric motor which is one of the driving sources. The motor 23 also functions as a generator, so as to transform the rotational energy (kinetic energy) of the wheel into electric energy, thereby effecting regenerative power generation. Upon receiving a motor control signal, the motor 23 is driven to rotate in response to the motor control signal, thereby generating a driving force. Upon receiving a regeneration control signal, the motor 23 generates electric power in response to the regeneration control signal and charges a battery with thus generated electric power.

The ECU 30, which comprises a CPU (Central Processing Unit), a ROM (Read Only Memory), a RAM (Random Access Memory), and the like, is an electronic control unit for controlling the automatic driving control apparatus 1 as a whole. The ECU 30 receives the respective signals from the sensors 10 to 15 and navigation system 16 at fixed intervals. By carrying out running locus optimization processing, initial condition generating processing, continuous curve responding processing, and the like, the ECU 30 generates an optimal running locus. According to thus generated optimal running locus, the ECU 30 carries out vehicle control processing, so as to control the steering actuator 20, throttle actuator 21, brake actuator 22, and motor 23.

In this embodiment, the running locus optimization processing in the ECU 30 corresponds to the constraint condition computing means and evaluation function computing means recited in the claims, the initial condition generating processing in the ECU 30 corresponds to the initial condition generating means recited in the claims, and the continuous curve responding processing in the ECU 30 corresponds to the block dividing means, fastest running optimizing means, passing time computing means, leeway time computing means, and target passing time computing means recited in the claims.

The running locus optimization processing will now be explained. For this optimization, any techniques may be used, an example of which is SCGRA (Sequential Conjugate Gradient Restoration Algorithm) disclosed in Non Patent Literature 1. The SCGRA performs a convergent computation according to the steepest descent method until a constraint condition is satisfied, and a convergent computation according to the conjugate gradient method until an evaluation function attains the minimum evaluation value. The constraint condition is a condition which must be obeyed when the vehicle runs. The evaluation function is a function for evaluating a condition to be focused on when the vehicle runs.

A hybrid vehicle can transform kinetic energy into electric energy by regeneration with the motor 23 when decelerated, and reuse the electric energy as kinetic energy by an output from the motor 23 when accelerated. Therefore, for improving the mileage, it is important for a battery to be in a state chargeable by regeneration (in a state not fully charged) anytime when a brake operation is done in the whole running path in order to prevent the kinetic energy at the time of deceleration from being wasted. When a brake operation is done in the case where the SOC (State of Charge) of the battery is a fully charged state, charging by regeneration cannot be effected, whereby the hydraulic brake is actuated. In this case, though the mileage does not change at this instant, the kinetic energy at the time of deceleration cannot be recovered as electric energy, so that the energy is wasted, whereby an ideal state of mileage cannot be attained as the whole running path (there is a strong possibility of useless acceleration being carried out somewhere). Hence, as an evaluation function, a function including the total electric power balance in this hybrid system when the electric power balance is positive is employed. While the electric power balance attains a large negative value on an uphill or the like, such evaluation with the positive electric power balance is used in order for values less than 0 to be evaluated as if they were 0. The electric power balance is the electric power stored by regeneration with the motor 23 minus the electric power used by the output of the motor 23, and becomes positive when the stored electric power is more than the electric power used. Optimizing the running locus by using this evaluation function yields an electric power balance of 0 or less (the electric power used is the electric power stored or more) in the block B as a whole, so that the SOC of the battery at the exit of the block B does not exceed that at the entrance thereof. Therefore, the battery can always be charged by regeneration, so that the kinetic energy at the time of deceleration can be prevented from being wasted.

However, running at a fixed low speed (e.g., the lowest vehicle speed on a curved road) focused on the mileage alone yields a practically unusable pattern, though it improves the mileage. Therefore, as the evaluation function, a function including not only the total electric power balance in the case where the electric power balance is positive but also the passing time of the block B is employed. Using this evaluation function can generate a running locus which enables running at a practically nonproblematic vehicle speed through the whole block B while yielding an electric power balance of 0 or less in the whole block B so that energy can always be recovered by regeneration.

The ECU 30 sets an initial locus as an initial condition and carries out a convergent computation according to the steepest descent method until a constraint condition is satisfied. The constraint condition encompasses road-side and vehicle-side conditions. An example of the road-side condition is a road boundary line (running on the road), while examples of the vehicle-side condition include vehicle performance limits such as friction circle, acceleration limit, deceleration limit, and steering limit. Specifically, a running locus at this time is convergently computed according to the constraint condition by using the previously obtained running locus (the initial locus in the initial convergent computation), it is determined whether or not the running locus obtained at this time satisfies the constraint condition, and the convergent computation and determination in each processing loop are repeated until a running locus satisfying the constraint condition is obtained. In each processing loop, a running locus constituted by (the number of meshes M, . . . ×the number of parameters) data items per block B is obtained.

When a running locus satisfying the constraint condition is derived, the ECU 30 carries out a convergent computation according to the conjugate gradient method until an evaluation function attains the minimum evaluation value. The evaluation function is a function obtained by adding a total positive electric power balance to the passing time of the block B as represented by expression (1), so that the passing time and total positive electric power balance in the block B as a whole become smaller. The passing time is a target time for passing the block B, examples of which include a time determined from a limit vehicle speed of the road and a time inputted by a driver. The regeneration efficiency is the energy recovery ratio at the time of regeneration/reoutput, which is determined depending on the hybrid system, e.g., 0.8 (80%). The regenerated power is deceleration energy within the upper limit of deceleration (e.g., 0.2 G, determined depending on the hybrid system) due to the regenerative brake of the motor 23 in the hybrid system. The acceleration power is acceleration energy within the upper limit of acceleration (e.g., 0.2 G, determined depending on the hybrid system) due to the output of the motor 23 in the hybrid system. Though the ratio of addition between the passing time and positive electric power balance is 0.5:0.5, any value may be set. For example, a ratio of addition inputted by the driver may be used.

[Math. 1]

$$\text{Evaluation value} = \sum_{i=1}^{\substack{number \\ of \\ meshes}} [0.5 \times \text{passing time} + 0.5 \times (\text{regenerated power} \times \text{regeneration efficiency} - \text{acceleration power})] \quad (1)$$

where $$\text{regenerated power} = m \times (v1^2 - v2^2) \times \frac{\text{deceleration upper limit by motor regeneration}}{\text{actual deceleration}},$$

$$\text{acceleration power} = m \times (v1^2 - v2^2) \times \frac{\text{acceleration upper limit by motor regeneration}}{\text{actual acceleration}},$$

m is the vehicle weight, and v1 and v2 are vehicle speeds in the front and rear meshes, respectively.

Specifically, a running locus at this time is convergently computed so that the evaluation function yields a smaller evaluation value by using the previously obtained running locus (the running locus satisfying the constraint condition in the initial convergent computation), it is determined whether or not the running locus obtained at this time yields the smallest evaluation value, and the convergent computation and determination in each processing loop are repeated until a running locus yielding the smallest evaluation value is obtained. When carrying out the convergent computation, the vehicle speed in the front mesh in the front and rear meshes with respect to the previous running locus is employed as v1, the vehicle speed in the rear mesh with respect to the previous running locus is employed as v2, and the acceleration (deceleration when expressed with the minus sign) between the front and rear meshes in the previous running locus is employed as the actual deceleration or acceleration. When carrying out the determination, the vehicle speed in the front mesh in the front and rear meshes with respect to the running locus obtained by the convergent computation at this time is employed as v1, the vehicle speed in the rear mesh with respect to the running locus obtained by the convergent computation at this time is employed as v2, and the acceleration between the front and rear meshes in the running locus obtained in the convergent computation at this time is employed as the actual deceleration or acceleration. In the determination of whether or not the evaluation value becomes the smallest, a differential value of the evaluation value is obtained, and it is determined that the evaluation value is the smallest when the differential value becomes 0 or substantially 0. When the acceleration power is (regenerated power× regeneration efficiency) or greater, the electric power balance does not become positive, whereby the addition of the term of electric power balance in expression (1) is deleted, so as to leave the passing time alone.

In the example illustrated in FIG. 2, a locus passing the block B at the fastest speed is a running locus C1, which becomes a running locus C2 when the positive electric power balance in the block B is also taken into consideration, and a running locus gradually approaching the optimal locus C2 is obtained as the convergent computation and determination by the evaluation function in each processing loop advances such that the evaluation function of expression (1) yields the smallest evaluation value. Since this example is a downhill, acceleration is attained on the curve exit side without motor output. Therefore, in order for the electric power balance to become 0 or less, such a running locus C2 as to enable high deceleration exceeding the deceleration upper limit (e.g., 0.2 G) by the regenerative brake on the curve entrance side (i.e., actuate the hydraulic brake as well) and shorten the passing time can be generated.

Initialization condition generating processing will now be explained. As preprocessing for the running locus optimization processing, an initial locus to become an initial condition is generated. The initial locus is a locus focused on deceleration regeneration, i.e., a locus focused on deceleration by regeneration in a hybrid vehicle. Hence, at the time of deceleration, the deceleration is effected as much as possible by regeneration alone, whereby the energy loss due to the heat dissipation can be reduced, which improves the mileage. Thus carrying out the running locus optimization processing by using the initial locus taking account of the mileage makes it possible to employ a running locus closer to the optimal running locus at the beginning of the optimization processing, so that erroneous running loci due to local minima can be evaded, while the number of convergent computations and determinations for yielding the optimal running locus can be reduced, whereby the processing load can be lowered.

Deceleration by regeneration alone yields a leeway at the time of deceleration by the amount of deceleration by the hydraulic brake as compared with deceleration by the deceleration capability (deceleration by the regenerative brake+ deceleration by the hydraulic brake) of the vehicle as a whole. When the deceleration capability of the whole vehicle is 1.0 G while the regenerative deceleration capability is 0.2 G, for example, a leeway of 0.8 G occurs at the time of deceleration. Therefore, when assuming a friction circle limit by lateral and longitudinal forces, distributing the leeway to the lateral force at the time of deceleration in a curved road can yield an ideal lateral G distribution under the condition of deceleration G<acceleration G, so as to elongate a running curve by the leeway at the time of deceleration, while it approaches a line at the time of acceleration because there is no leeway. For attaining such a running locus on a curved road, it is necessary to move a clipping point and a minimum vehicle speed point toward the curve entrance and exit, respectively. Since this initial locus cannot be applied to linear roads, they are provided with a given locus as an initial locus for the running locus optimization processing.

First, the ECU 30 generates an out-in-out running locus which is typical for running through curved roads. Then, the ECU 30 determines a regenerative deceleration upper limit (e.g., 0.2 G, which may have been known to the system) according to the system capability as the hybrid vehicle. The ECU 30 also determines an acceleration upper limit (e.g., 0.4 G, which may have been known to the system) yielding a favorable thermal efficiency in the engine output at the time of acceleration.

According to the deceleration upper limit and acceleration upper limit, the ECU 30 moves the clipping point at the center of the curve in the out-in-out running locus toward the entrance of the curve. For example, the moving ratio of the clipping point is determined by expression (2).

[Math. 2]

$$\text{Clipping point ratio} = \frac{\text{deceleration upper limit}}{\text{acceleration upper limit} + \text{deceleration upper limit}} \quad (2)$$

According to the deceleration upper limit and acceleration upper limit, the ECU 30 moves the minimum speed point (maximum curvature point) at the center of the curve in the out-in-out running locus toward the curve exit. For example, the minimum speed point is moved by the moving ratio of the clipping point toward the exit (to a point symmetrical to the moved clipping point).

Then, the ECU 30 connects the moved clipping point, minimum speed point, and the like with a smooth curve, thereby generating an initial locus. Any curve may be used as the smooth curve, an example of which is a clothoid curve.

In the example of FIG. 3, the clipping point CP3 and minimum speed point VP3 in the out-in-out running locus are moved to points CP4 and VP4 on the curve entrance and exit sides, respectively, whereby an initial locus C4 is generated.

The continuous curve responding processing will now be explained. When curves continue in a mountain road or the like, each curve is divided into a plurality of blocks in respective units of curved roads or linear roads, and each unit is subjected to optimization processing. Here, as illustrated in FIG. 4, a total leeway time is determined by subtracting a total fastest passing time from a target passing time in the whole continuous curve and then is distributed to blocks B1, . . . in proportion to respective amounts of heat dissipation by the hydraulic brake in the blocks B1, . . . , whereby respective leeway times (which may be later than the fastest running) are allocated thereto. Subsequently, for each of the blocks B1, . . . , a target passing time is determined from its fastest passing time and leeway time, and the optimization processing is carried out while using this target passing time as a constraint condition. The heat dissipating amount by the hydraulic brake is used for deciding the distribution, since the mileage can be improved by reducing the heat dissipation due to the hydraulic brake (useless energy).

The blocks with a longer leeway time have more leeway in the passing time, whereby a running locus more focused on the mileage can be generated therefor. On the other hand, the blocks with a shorter leeway time have less leeway in the passing time, whereby a running locus more focused on faster running is generated therefor. Thus, the blocks are divided into those focused on the mileage and those focused on the speed, and then the optimization processing can be carried out for each block, whereby the memory and processing load can be reduced. When carried out for the whole curve, the optimization processing is relatively easy in the case where only the fastest running is considered. When the running focused on the mileage is also taken into consideration, however, a constraint condition with a time (average speed) designating the total passing time of a plurality of blocks (average speed) is employed in general, whereby an enormous memory and a complicated program are necessary for solving it over a plurality of blocks, which also increases the processing load.

In the case of a continuous curve, the ECU 30 divides it into a plurality of blocks in units of respective curved roads or linear roads. The ECU 30 also carries out the optimization processing over the whole continuous curve under the fastest running condition, so as to generate a running locus at the fastest speed, thereby yielding a total fastest passing time. Here, a conventional technique is used for carrying out the optimization processing under the fastest running condition.

The ECU 30 computes the fastest passing time for each block according to the total fastest passing time. By using the total fastest passing time and a total target passing time, the ECU 30 computes a total leeway time according to expression (3). The total target passing time is a target time for passing the continuous curve as a whole, for which a time inputted by the driver may be used, for example.

[Math. 3]

$$\text{Total leeway time} = \text{total target passing time} - \text{total fastest passing time} \quad (3)$$

The ECU 30 determines whether or not the total leeway time is less than 0. When the total leeway time is less than 0, the total target passing time cannot be achieved even when running at the fastest speed, whereby the running locus obtained by the optimization processing under the fastest running condition is employed.

When the total leeway time is 0 or longer, a total passing time shorter than the total target passing time can be achieved when running at the fastest speed. In this case, the ECU 30 computes the brake heat dissipating amount in each block. Any computing method can be used therefor. By using the total leeway time, the brake heat dissipating amount of each block, and the brake heat dissipating amount of all the blocks, the ECU 30 computes the leeway time in each block according to expression (4).

[Math. 4]

$$\text{Block leeway time} = \text{total leeway time} \times \frac{\text{block brake heat dissipating amount}}{\text{total brake heat dissipating amount}} \quad (4)$$

By using the fastest passing time and leeway time in each block, the ECU 30 computes the target passing time in each block according to expression (5).

[Math. 5]

$$\text{Block target passing time} = \text{block fastest passing time} + \text{block leeway time} \quad (5)$$

Then, for each block, the ECU 30 carries out the optimization processing while adding the target passing time in the block to the constraint condition, so as to generate a running locus. Here, while the above-mentioned running locus optimization processing is carried out, the constraint condition includes the target passing time in addition, and the optimization processing is performed with an evaluation function in which only a positive electric power balance is employed as a condition by removing the passing time condition.

The vehicle control function will now be explained. While taking account of obstacles (such as front vehicles) about the own vehicle, in order for the vehicle to run according to the determined optimal running locus, the ECU 30 generates a steering control signal, an engine control signal, a brake control signal, and a motor control signal or regeneration control signal according to a deviation between the optimal running locus and the actual vehicle state (e.g., yaw rate, lateral G, longitudinal G, vehicle speed, absolute position, and relative relationship to the lane center) at fixed time intervals and transmits them to the steering actuator 20, throttle actuator 21, brake actuator 22, and motor 23, respectively.

Figure 5:
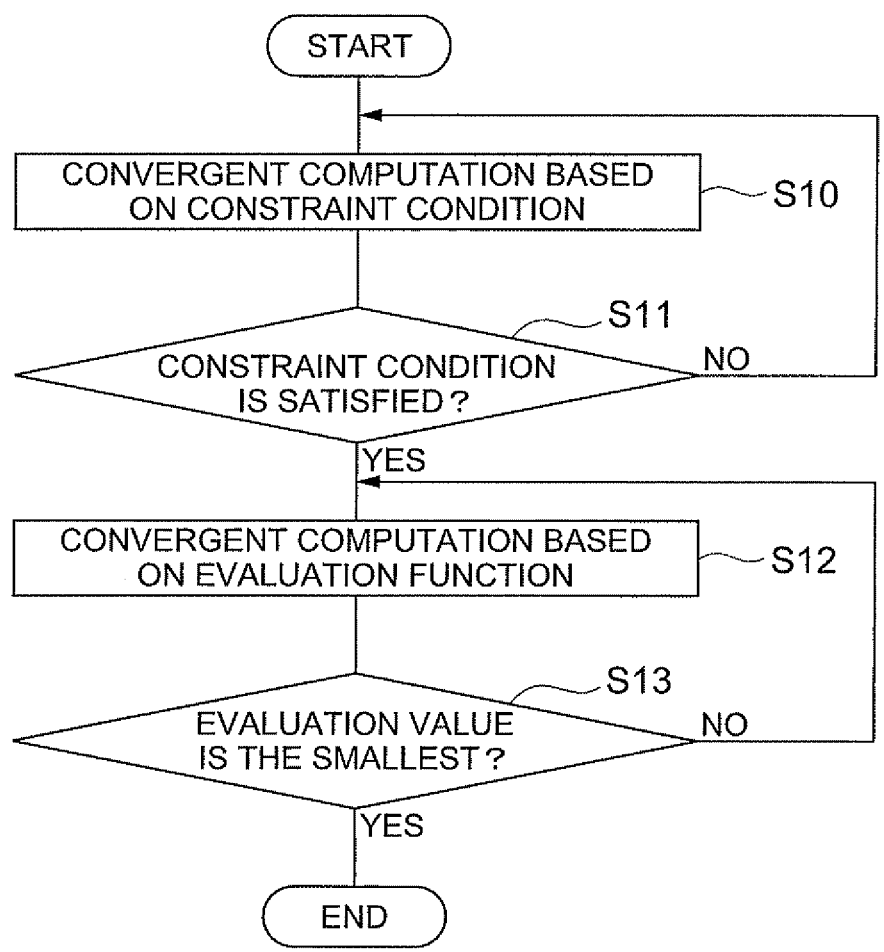
[FIG. 5] is a flowchart illustrating a flow of running locus optimization processing in an ECU in accordance with the embodiment.
Figure 6:
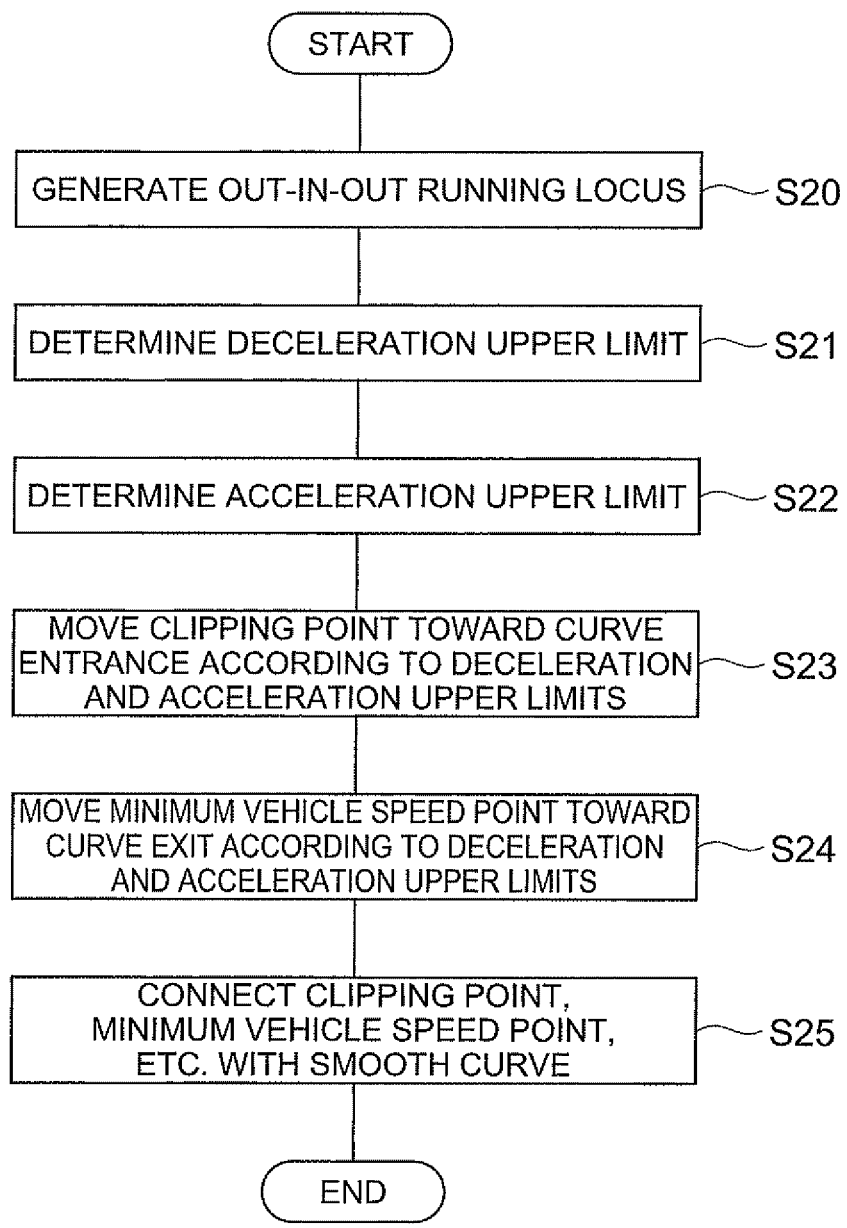
[FIG. 6] is a flowchart illustrating a flow of initial condition generating processing in the ECU in accordance with the embodiment.
Figure 7:
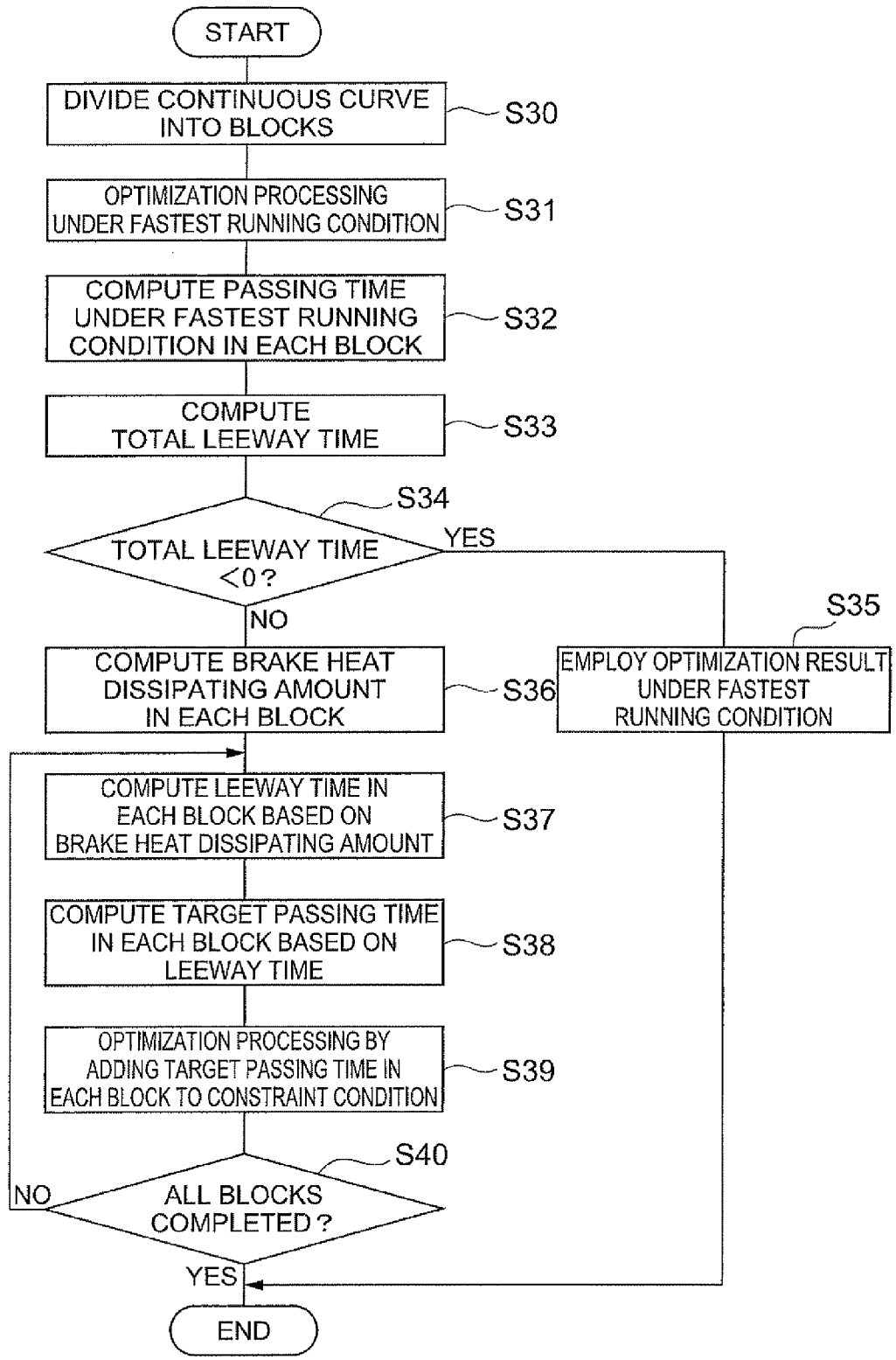
[FIG. 7] is a flowchart illustrating a flow of continuous curve responding processing in the ECU in accordance with the embodiment.

Operations in the automatic driving control apparatus 1 will now be explained with reference to FIGS. 1 to 4. Here, respective operations of the running locus optimizing function, initial condition generating function, and continuous curve responding function in the automatic driving control apparatus 1 will be explained. In particular, the running locus optimization processing, initial condition generating processing, and continuous curve responding processing in the ECU 30 will be explained along the flowcharts of FIGS. 5, 6, and 7, respectively. FIG. 5 is a flowchart illustrating a flow of the running locus optimization processing in the ECU in accordance with this embodiment. FIG. 6 is a flowchart illustrating a flow of the initial condition generating processing in the ECU in accordance with this embodiment. FIG. 7 is a flowchart illustrating a flow of the continuous curve responding processing in the ECU in accordance with this embodiment.

The running locus optimizing function will now be explained. The navigation system 16 reads shape information of a road where the vehicle is currently running from a map database and transmits the road shape information as a navigation signal to the ECU 30. The ECU 30 receives the navigation signal, thereby acquiring the road shape information.

By employing the initial locus set by the initial condition generating function and the like, the ECU 30 carries out a convergent computation according to a constraint condition based on road boundaries and vehicle performance limits, thereby generating a running locus (S10). The ECU 30 determines whether or not the running locus generated at this time satisfies the constraint condition (S11). When it is determined at S11 that the constraint condition is not satisfied, the ECU 30 performs a convergent computation according to the constraint condition by using the previously generated running locus, thereby generating a running locus (S10), and determines whether or not the running locus generated at this time satisfies the constraint condition (S11).

When it is determined at S11 that the constraint condition is satisfied, the ECU 30 carries out a convergent computation according to an evaluation function constituted by the passing time of the block B and the total electric power balance when the electric power balance is positive in the hybrid system, while using the running locus satisfying the constraint condition, so as to generate a running locus (S12). The ECU 30 determines whether or not the evaluation value of the running locus generated at this time is the smallest (S13). When it is determined at S13 that the evaluation value is not the smallest, the ECU 30 carries out a convergent computation according to the evaluation function while using the previously generated running locus (S12) and determines whether or not the evaluation value of the running locus generated at this time is the smallest (S13).

When it is determined at S13 that the evaluation value is the smallest, the ECU 30 employs thus generated running locus as the optimal locus. Then, the automatic driving control apparatus 1 performs acceleration/deceleration control and steering control (vehicle control function) so that the vehicle runs along the optimal locus.

In this embodiment, the processing of S10 and S11 corresponds to the constraint condition computing step recited in the claims, while the processing of S12 and S13 corresponds to the evaluation function computing step recited in the claims.

The initial condition generating function will now be explained. When the running path for generating the optimal locus is a curved road, the ECU 30 generates an out-in-out running locus (S20). The ECU 30 also determines a deceleration upper limit due to the regenerative deceleration in the hybrid vehicle (S21) and an acceleration upper limit yielding a favorable engine output thermal efficiency (S22).

Then, according to the deceleration upper limit and acceleration upper limit, the ECU 30 moves an out-in-out clipping point toward the curve entrance (S23). The ECU 30 also moves an out-in-out minimum vehicle speed point toward the curve exit (S24). Then, the ECU 30 connects the moved clipping point, minimum vehicle speed point, and the like with a smooth curve, so as to generate an initial locus, and uses this initial locus as an initial condition in the running locus optimizing function.

In this embodiment, the processing of S20 to S25 corresponds to the initial condition generating step recited in the claims.

The continuous curve responding function will now be explained. When the running path for generating the optimal locus is a continuous curve, the ECU 30 divides the continuous curve into a plurality of blocks (S30). The ECU 30 also carries out the optimization processing for the whole continuous curve under the fastest running condition, so as to determine the total fastest passing time in the continuous curve (S31). Then, the ECU 30 distributes the total fastest passing time to the blocks, thereby computing the respective fastest passing times for the blocks (S32).

The ECU 30 subtracts the total fastest passing time from the total target passing time, thereby computing the total leeway time in the whole continuous curve (S33). Then, the ECU 30 determines whether or not the total leeway time is less than 0 (S34). When it is determined that the total leeway time is less than 0 at S34, the ECU 30 employs the running locus generated by the optimization processing under the fastest running condition as an optimal locus (S35). Then, the automatic driving control apparatus 1 performs acceleration/deceleration control and steering control so that the vehicle runs according to this optimal locus.

When it is determined at S34 that the total leeway time is 0 or longer, the ECU 30 computes respective brake heat dissipating amounts in the blocks (S36). Then, the ECU 30 computes the leeway time of each block according to the brake heat dissipating amount in the block (S37). For each block, the ECU 30 computes a target passing time according to the leeway time and fastest passing time in the block (S38). For each block, by adding the target passing time of the block to the constraint condition (but removing the passing time from the evaluation function), the ECU 30 carries out the optimization processing (performs the above-mentioned running locus optimizing function), thereby generating an optimal locus (S39).

The ECU 30 determines whether or not the optimization processing has been completed for all the blocks in the continuous curve (S40). When it is determined at S40 that the processing has not been completed yet, the ECU 30 returns to S37 and carries out processing for the next block. When it is determined at S40 that the processing has been completed, on the other hand, the automatic driving control apparatus 1 performs acceleration/deceleration control and steering control so that the vehicle runs according to the generated optimal running locus.

In this embodiment, the processing of S30, processing of S31, processing of S32, processing of S36 and S37, and processing of S38 correspond to the block dividing step, fastest running optimizing step, passing time computing step, leeway time computing step, and target passing time computing step recited in the claims, respectively.

By carrying out the optimization processing with an evaluation function adding an electric power balance in a hybrid system when the electric power balance is positive to the passing time in the block B, the automatic driving apparatus 1 can generate an optimal locus satisfying both of a practical running time and an improvement in the mileage. This optimal locus yields an electric power balance of 0 or less in the running path as a whole, whereby the vehicle can run at a practical speed. As a result, the battery is always chargeable by regeneration at the time of deceleration, whereby the kinetic energy at the time of deceleration can be prevented from becoming useless. In particular, a favorable running locus can be generated in a curved road which generates a lateral force and requires acceleration or deceleration. While electric power is stored at the time of deceleration on the curve entrance side and used at the time of acceleration on the curve exit side, the running with this running locus makes the SOC of the battery at the curve exit equal to or less than that at the curve entrance.

By generating the initial locus taking account of a mileage characteristic focused on the regenerative deceleration, the automatic driving control apparatus 1 can use a running locus closer to the optimal locus from the beginning of the optimal processing and thus can prevent erroneous running loci from being caused by local minima, and can reduce the processing load as well.

Also, by distributing the leeway time according to the respective brake heat dissipating amounts of the blocks in a continuous curve, the automatic driving control apparatus 1 can carry out the optimal processing individually for each block while using the target passing time as a constraint condition, whereby the memory and processing load can be reduced.

Though an embodiment in accordance with the present invention is explained in the foregoing, the present invention is carried out in various modes without being restricted to the above-mentioned embodiment.

For example, though this embodiment is employed in an automatic driving hybrid vehicle, it is also applicable to vehicles performing various driving assistances with optimal loci for manual driving and vehicles having single driving sources such as internal combustion engines and motors. In particular, the continuous curve responding function is also applicable to vehicles using only internal combustion engines as their driving sources, while the running locus optimizing function and initial condition generating function are applicable to hybrid vehicles alone.

The present invention is employed in an automatic driving control apparatus which generates an optimal locus and performs automatic driving according to the optimal locus in this embodiment, but may also be applied to an apparatus which generates an optimal locus and provides the driver with this optimal locus by displaying and the like or an apparatus which generates an optimal locus and performs various driving assistances by using the optimal locus.

The present invention may be constituted by a plurality of ECUs instead of the single ECU in this embodiment.

Though the evaluation function is a function in which the passing time and positive electric power balance are added, the evaluation function may be constituted by a positive electric power balance alone, whereby the optimal locus focused on the mileage alone can be generated.

Though this embodiment is constructed such as to determine a locus focused on deceleration regeneration by moving the clipping point and minimum vehicle speed point according to the deceleration upper limit and acceleration upper limit, the locus focused on deceleration regeneration may be determined by other techniques as well.

The leeway time may be distributed according to not only the brake heat dissipating amount as in this embodiment but also other parameters taking account of the mileage characteristic.

The invention claimed is:

1. A running locus generating method of generating a future running locus of a vehicle driven by a hybrid scheme, the method executed by an Electronic Control Unit, the method comprising:

computing a running locus that satisfies a constraint condition including at least a road boundary condition by a convergent computation; and deriving a final running locus by a convergent computation with an evaluation function using the running locus satisfying the constraint condition in an initial convergent computation while the constraint condition in the computing the running locus step is satisfied, wherein the evaluation function includes at least an evaluation of an electric power balance in a hybrid system when the electric power balance is in a positive state.

2. The running locus generating method according to claim 1, further comprising:

generating an initial running locus preferring regenerative deceleration when decelerating the vehicle as an initial condition, wherein the computing of the running locus step computes the running locus by using the initial running locus in an initial convergent computation.

3. The running locus generating method according to claim 2, wherein the generating the initial running locus step generates the initial running locus moving a clipping point and a minimum speed point toward a curve entrance and a curve exit, respectively, according to deceleration and acceleration upper limits determined by a system capability of the hybrid scheme.

4. The running locus generating method according to claim 1, further comprising:

dividing a continuous curve into a plurality of blocks;

performing optimization processing under a fastest running condition;

computing respective passing times of the blocks divided by the dividing a continuous curve step according to a result of the optimization in the performing optimization processing step;

computing respective leeway times of the blocks divided by the dividing a continuous curve step according to respective brake heat dissipating amounts in the blocks; and computing respective target passing times of the blocks according to the respective passing times of the blocks computed in the computing respective passing times step and the respective leeway times of the blocks computed in the computing respective leeway times step.

5. A running locus generating apparatus including an Electronic Control Unit, for generating a future running locus of a vehicle driven by a hybrid scheme, the running locus generating apparatus comprising:

a constraint condition computing unit for computing a running locus that satisfies a constraint condition including at least a road boundary condition by a convergent computation; and an evaluation function computing unit for deriving a final running locus by a convergent computation with an evaluation function using the running locus satisfying the constraint condition in an initial convergent computation while the constraint condition in the computing the running locus step is satisfied, wherein the evaluation function includes at least an evaluation of an electric power balance in a hybrid system when the electric power balance is in a positive state.

6. The running locus generating apparatus according to claim 5, further comprising an initial condition generating unit for generating an initial running locus preferring regenerative deceleration when decelerating the vehicle as an initial condition, wherein the constraint condition computing unit computes the running locus by using the initial running locus in an initial convergent computation.

7. The running locus generating apparatus according to claim 6, wherein the initial condition generating unit generates the initial running locus moving a clipping point and a minimum speed point toward a curve entrance and a curve exit, respectively, according to deceleration and acceleration upper limits determined by a system capability of the hybrid scheme.

8. The running locus generating apparatus according to claim 5, further comprising:

a block dividing unit for dividing a continuous curve into a plurality of blocks;

a fastest running optimizing unit for performing optimization processing under a fastest running condition;

a passing time computing unit for computing respective passing times of the blocks divided by the block dividing unit according to a result of the optimization by the fastest running optimizing unit;

a leeway time computing unit for computing respective leeway times of the blocks divided by the block dividing unit according to respective brake heat dissipating amounts in the blocks; and a target passing time computing unit for computing respective target passing times of the blocks according to the respective passing times of the blocks computed by the passing time computing unit and the respective leeway times of the blocks computed by the leeway time computing unit.

* * * * *